US012234803B2

(12) United States Patent
Österberg

(10) Patent No.: US 12,234,803 B2
(45) Date of Patent: Feb. 25, 2025

(54) WIND TURBINE POWER TRANSMISSION SYSTEM

(71) Applicant: Vestas Wind Systems A/S, Aarhus N (DK)

(72) Inventor: David Österberg, Horsens (DK)

(73) Assignee: Vestas Wind Systems A/S, Aarhus N. (DK)

( * ) Notice: Subject to any disclaimer, the term of this patent is extended or adjusted under 35 U.S.C. 154(b) by 397 days.

(21) Appl. No.: 17/783,701

(22) PCT Filed: Nov. 11, 2020

(86) PCT No.: PCT/DK2020/050306
§ 371 (c)(1),
(2) Date: Jun. 9, 2022

(87) PCT Pub. No.: WO2021/121493
PCT Pub. Date: Jun. 24, 2021

(65) Prior Publication Data
US 2022/0389911 A1 Dec. 8, 2022

(30) Foreign Application Priority Data
Dec. 16, 2019 (DK) .............................. PA 2019 70776

(51) Int. Cl.
*F03D 15/00* (2016.01)
*F16D 3/76* (2006.01)
*F16D 3/78* (2006.01)

(52) U.S. Cl.
CPC ............... *F03D 15/00* (2016.05); *F16D 3/76* (2013.01); *F16D 3/78* (2013.01); *F05B 2240/61* (2013.01);
(Continued)

(58) Field of Classification Search
CPC ... F03D 15/00; F16D 3/76; F16D 3/78; F05B 2240/61; F05B 2240/62; F05B 2260/403; F05B 2280/5001; Y02E 10/72
See application file for complete search history.

(56) References Cited

U.S. PATENT DOCUMENTS 3,010,294 A 11/1961 Spier
9,771,924 B2 9/2017 Demtroder et al.
(Continued)

FOREIGN PATENT DOCUMENTS

EP 2739849 A1 6/2014
WO WO-2012052022 A1 * 4/2012 ............. F03D 13/00
(Continued)

OTHER PUBLICATIONS

Danish Patent and Trademark Office, Search and Examination Report in PA 2019 70776, Jul. 10, 2020.
(Continued)

*Primary Examiner* — Michael C Zarroli
(74) *Attorney, Agent, or Firm* — Wood Herron & Evans LLP

(57) ABSTRACT

A power transmission system for a wind turbine includes a main shaft configured to be driven by the rotor about a main axis, a support structure including at least one bearing supporting the main shaft for rotation about the main axis, and a gearbox having a gearbox housing rigidly coupled to the support structure and a gearbox input member coupled to the main shaft. The gearbox housing supports the gearbox input member for rotation about the main axis, and the gearbox input member is coupled to the main shaft with a translational degree of freedom along the main axis and rotational degrees of freedom about axes perpendicular to the main axis. The main shaft is coupled to the gearbox input member by a flexible coupling positioned at least partially
(Continued)

within the main shaft. The flexible coupling may be positioned entirely within the main shaft.

20 Claims, 6 Drawing Sheets

(52) U.S. Cl.
CPC ..... *F05B 2240/62* (2013.01); *F05B 2260/403* (2013.01); *F05B 2280/5001* (2013.01)

(56) References Cited

U.S. PATENT DOCUMENTS

2002/0049108 A1    4/2002  Hosle
2019/0301436 A1   10/2019  Trede et al.

FOREIGN PATENT DOCUMENTS

| WO | WO-2013021181 A1 * | 2/2013 | ............. F03D 15/00 |
| WO | 2013080399 A2 | 6/2013 | |

OTHER PUBLICATIONS

European Patent Office, International Search Report and Written Opinion in PCT Application No. PCT/DK2020/050306, Jan. 26, 2021.

* cited by examiner

WIND TURBINE POWER TRANSMISSION SYSTEM

TECHNICAL FIELD

This invention generally relates to power transmission systems, and more particularly to power transmission systems for wind turbines.

BACKGROUND

Wind turbines typically include a rotor with large blades driven by the wind. The rotor blades convert the kinetic energy of the wind into rotational mechanical energy. The mechanical energy usually drives one or more generators to produce electrical power. Thus, wind turbines include a power transmission system to process and convert the rotational mechanical energy into electrical energy. The power transmission system is sometimes referred to as the "power train" of the wind turbine. The portion of a power transmission system from the wind turbine rotor to the generator is referred to as the drive train.

Oftentimes, it is necessary to increase the rotational speed of the wind turbine rotor to the speed required by the generator(s). This is accomplished by a gearbox between the wind turbine rotor and generator. Thus, the gearbox forms part of the drive train and converts a low-speed, high-torque input from the wind turbine rotor into a lower-torque, higher-speed output for the generator.

Transmitting torque is not the only function of a wind turbine power transmission system. The secondary function is to transfer other rotor loads to a nacelle structure and tower supporting the system. Indeed, the wind turbine rotor experiences a variety of loads due to variable wind conditions, dynamic interactions, control aspects, gravity, and other factors. The path of these loads through the power transmission system depends on the particular arrangement. Although components are designed with the corresponding load path in mind, the unpredictability, variety, and magnitude of the loads makes this very challenging. Moreover, even properly designed components may not accurately take into account machine tolerances, load deformations, thermal expansions/variations, and other conditions. These conditions may result in undesirable, "parasitic" forces that have the potential to damage elements in the power transmission system, particularly the gearbox components and the main bearing(s). As a result, gearbox and bearing reliability is one of the biggest concerns in the wind turbine industry and solution to address these concerns are highly desirable.

Commonly-owned U.S. Pat. No. 9,771,924 ("the '924 patent"), entitled "Wind Turbine Power Transmission System," the disclosure of which is fully incorporated herein by reference, provides a variety of solutions addressing such reliability concerns. Nevertheless, further improvement is desired. For example, the '924 patent discloses a flexible coupling between the main shaft and the gearbox input member and surrounded by a coupling housing which connects the gearbox housing to the main bearing housing of the wind turbine. In many cases, such a coupling housing may consume significant space in the nacelle, where space is already at a premium. It would therefore be desirable to address the above-described reliability concerns while also sizably reducing (e.g., shortening) or eliminating the coupling housing.

SUMMARY

A power transmission system for increasing the rotational speed from a rotor of a wind turbine is disclosed. The power transmission system includes a main shaft configured to be driven by the rotor about a main axis and a support structure including at least one bearing supporting the main shaft for rotation about the main axis and constraining other movements of the main shaft. The power transmission system further includes a gearbox having a gearbox housing rigidly coupled to the support structure and a gearbox input member coupled to the main shaft. The gearbox housing supports the gearbox input member for rotation about the main axis while constraining other movements of the gearbox input member. The gearbox input member is coupled to the main shaft with a translational degree of freedom along the main axis and rotational degrees of freedom about axes perpendicular to the main axis. The main shaft is coupled to the gearbox input member by a flexible coupling positioned at least partially within the main shaft. For example, the main shaft may define an interior cavity and includes an internal ledge positioned within the interior cavity, and at least a portion of the flexible coupling may be attached to the internal ledge. In one embodiment, the flexible coupling may be positioned entirely within the main shaft.

The flexible coupling may include a flexible disc. In one embodiment, the flexible disc may be substantially flat. In an alternative embodiment, however, the flexible disc may include an annular ridge. The flexible disc has an inner region adjacent the inner diameter coupled to the gearbox input member and an outer region adjacent the outer diameter coupled to the main shaft. The flexible disc may have an outer diameter that is substantially greater than a thickness of the flexible disc and that is substantially greater than an inner diameter of the flexible disc. In addition to the above degrees of freedom, in a further alternative embodiment, the gearbox input member may be coupled to the main shaft with translational degrees of freedom along the axes perpendicular to the main axis.

In one embodiment, the flexible coupling may include a spline tooth coupling. The spline tooth coupling may be defined by a coupling flange of the main shaft and a coupling flange of the gearbox input member, each circumferentially engaging a coupling element, such as a tubular coupling element. The coupling flanges each include radially projecting teeth and the coupling element includes radially projecting teeth configured to engage the radially projecting teeth of the coupling flanges thereby defining two gear meshes. One set of radially-projecting teeth in each gear mesh may have substantially straight profiles while the other set may have profiles crowned in an axial direction. For example, the radially-projecting teeth of the coupling flanges may have crowned profiles. The coupling flanges may be configured to surround the coupling element. In one embodiment, the spline tooth coupling may be elastic. The elastic spine tooth coupling may be defined by a flexible tube of the main shaft terminating at a coupling element, and by a coupling flange of the gearbox input member which circumferentially engages the coupling element. The flexible tube and the coupling element may be integrally formed together with the main shaft as a unitary piece. The support structure includes a bearing housing. In an exemplary embodiment, the bearing housing may be directly coupled to the gearbox housing. Such a design may save significant space within a nacelle of a wind turbine.

In a further embodiment, a wind turbine includes a rotor having a hub and a plurality of blades extending outwardly from the hub, and the power transmission system described above. The main shaft is coupled to the hub so as to be driven by the rotor.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
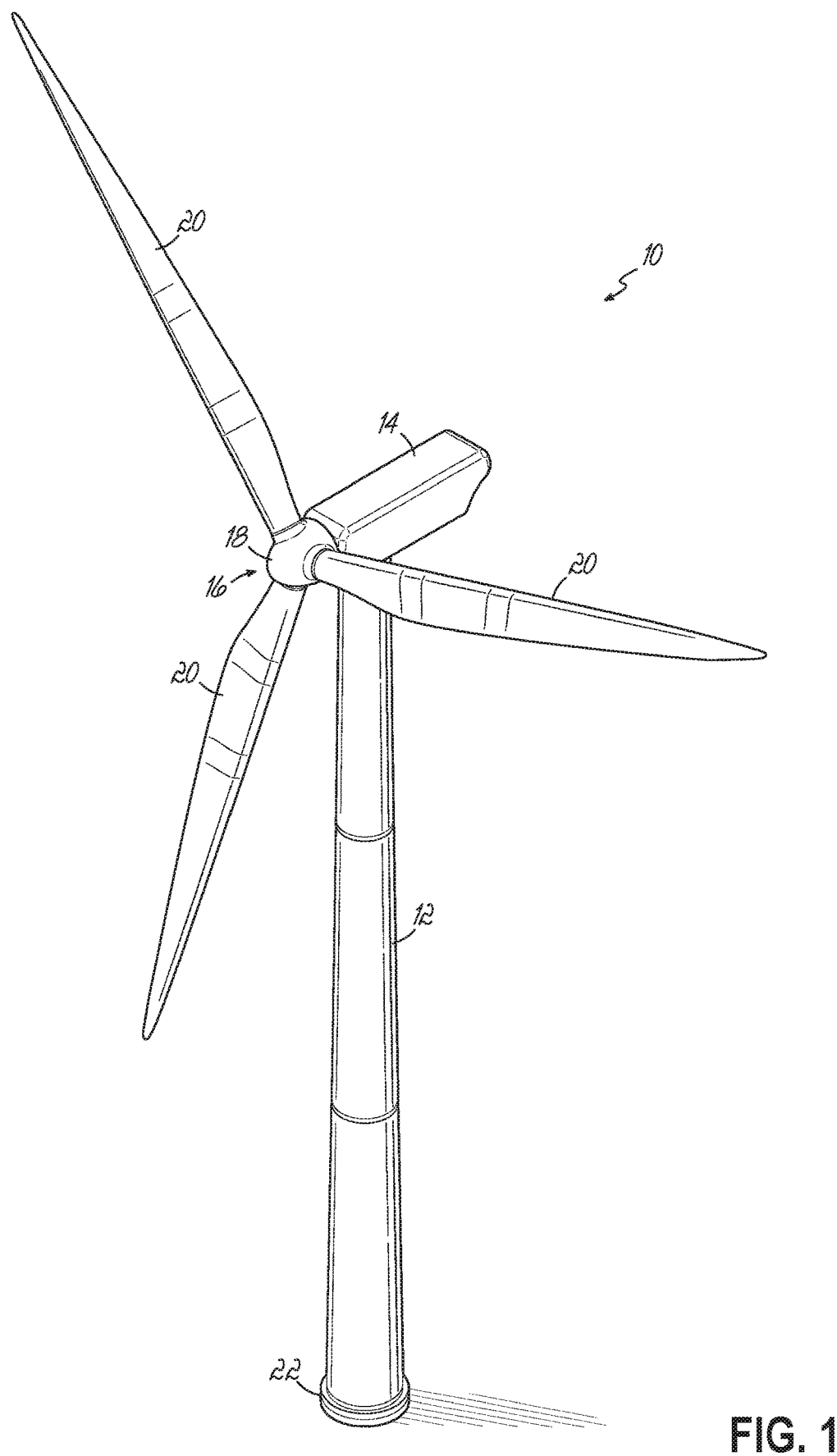
FIG. 1 is a perspective view of an exemplary wind turbine in accordance with an aspect of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of the wind turbine 10 includes a central rotor hub 18 and a plurality of blades 20 that project outwardly from the central hub 18 at locations circumferentially distributed thereabout in equal intervals. In the representative embodiment, the rotor 16 includes three blades 20, but the number may vary. The blades 20 are configured to interact with the passing air flow to produce lift that causes the rotor hub 18 to spin about a longitudinal axis defined thereby. As shown, the tower 12 includes a foundation or base 22 for supporting the wind turbine 10 on a surface. It should be recognized that the wind turbine 10 may be an on-shore or an off-shore wind turbine.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
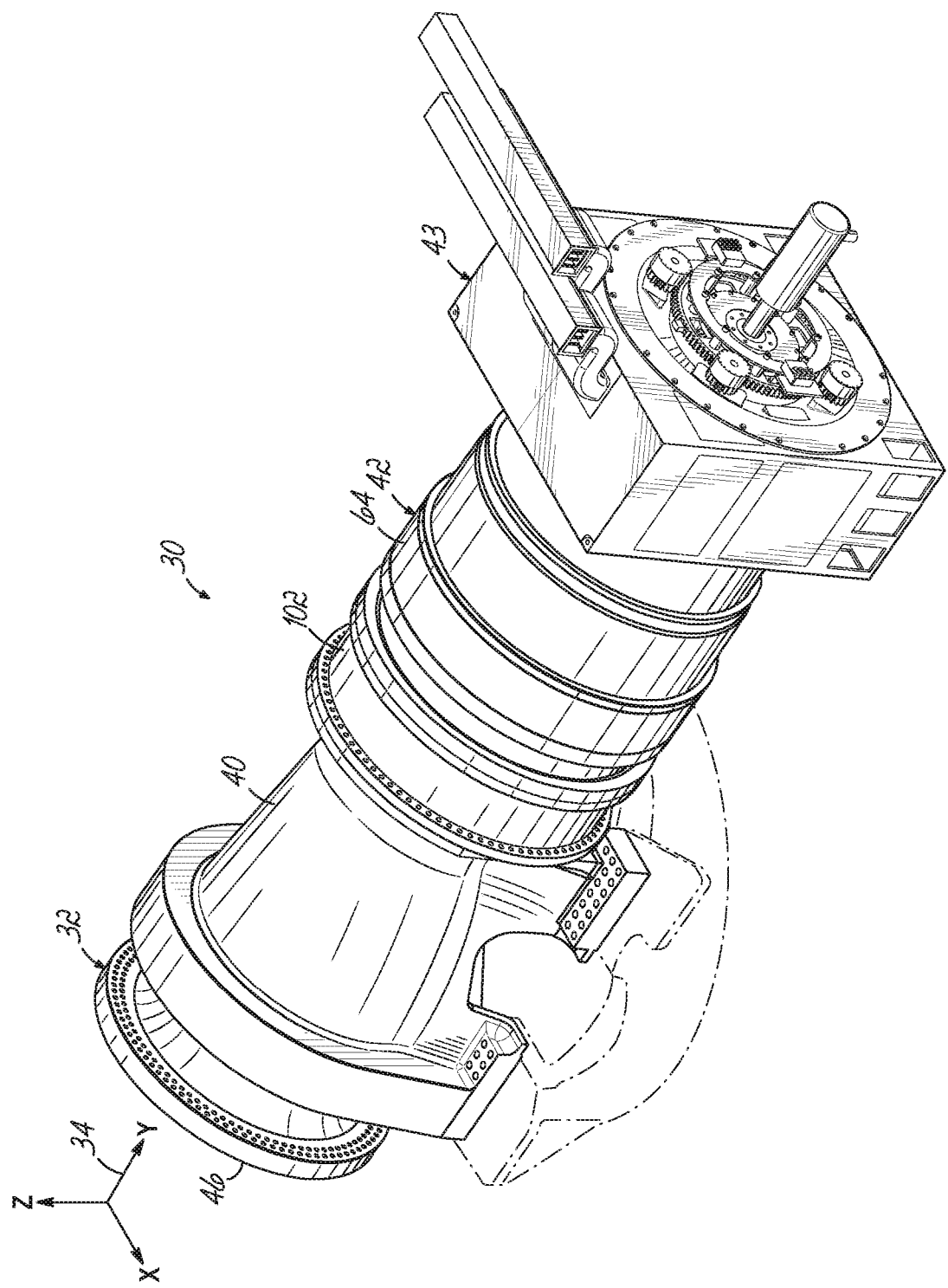
FIG. 2 is a perspective view of a power transmission system for the wind turbine of FIG. 1.
Figure 3:
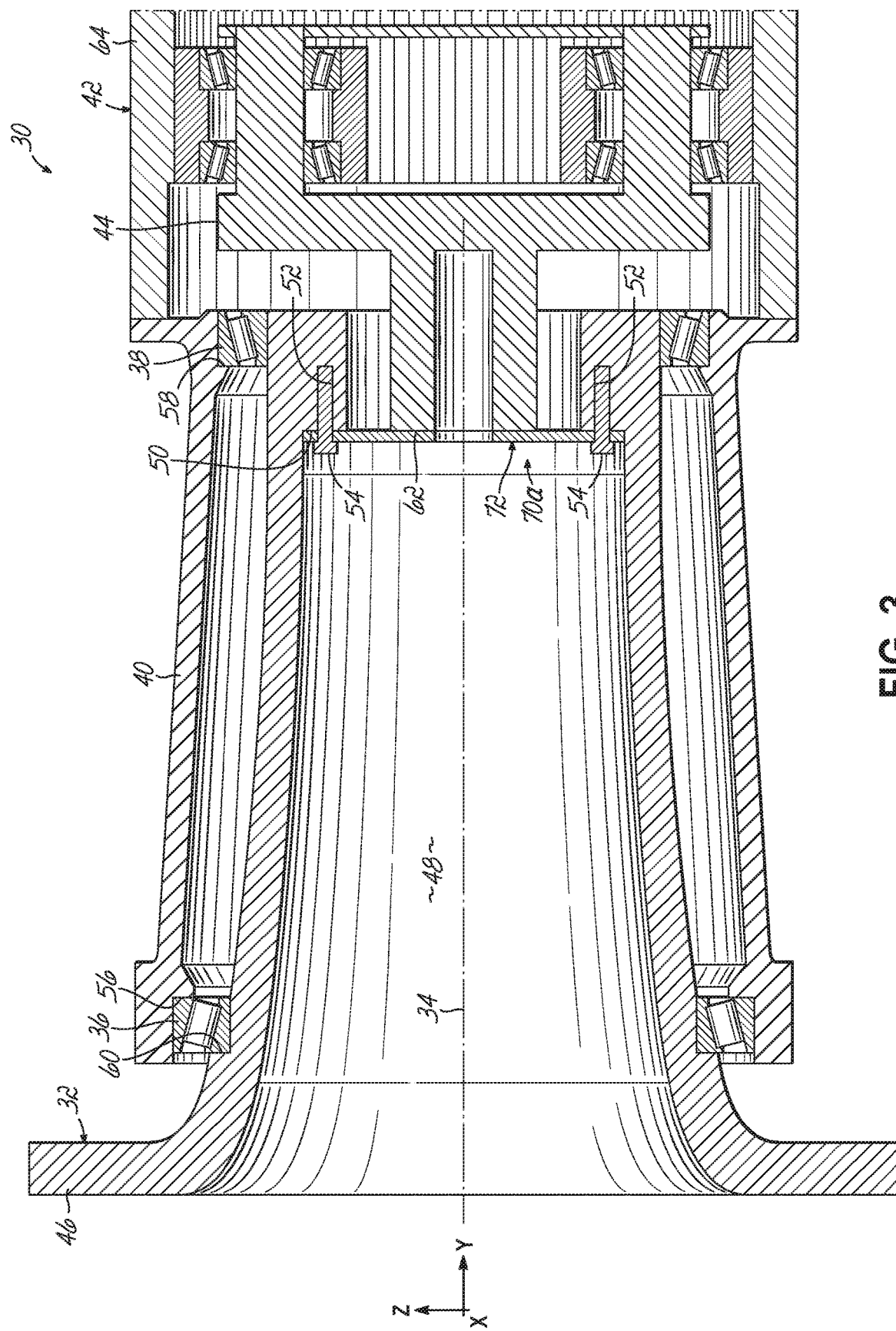
FIG. 3 is a partial cross-sectional view of the power transmission system of FIG. 2.

As shown in FIGS. 2 and 3, an exemplary power transmission system 30 includes a main shaft 32 coupled to the hub 18 (FIG. 1) and rotatable about a main axis 34. The power transmission system 30 also includes first and second bearings 36, 38 supporting the main shaft 32, a bearing housing 40 surrounding the first and second bearings 36, 38, and a gearbox 42 having a gearbox input member 44 driven by the main shaft 32. The gearbox 42 increases the rotational speed of the main shaft 32 to drive a generator 43.

The kinematics of the power transmission system 30 will also be described in greater detail below. For this purpose, it will be convenient to make reference to a three-dimensional coordinate system based upon the main axis 34. In this coordinate system, the y-axis is defined along the main axis 34. The x-axis and z-axis are perpendicular to the y-axis, with the z-axis being generally aligned with the gravitational direction. The relationships between kinematic bodies will be described in terms of degrees of freedom. A "body" is a single element or group of elements substantially rigidly connected such that distances between points in the body are effectively fixed under normal conditions. Stated differently, all elements of a body effectively move together with respect to the same reference system under normal conditions; relative movement is not intended. A "degree of freedom" refers to the ability of one body to move in translational or rotational directions relative to another body to which it is joined. The joint is specifically designed with relative movement in mind when there is one or several degree(s) of freedom. The translational and rotational directions are defined with reference to the coordinate system.

With continuing reference to FIG. 3, the main shaft 32 includes a flange portion 46 at the end connecting to the hub 18 (FIG. 1). The flange portion 46 enables the main shaft 32 to be coupled to the hub 18 with bolts. In other embodiments, the main shaft 32 may be coupled to the hub 18 by a hirth connection, a combined pin bolt connection, or some other arrangement that ensures the transfer of torque. Furthermore, although the flange portion 46 is shown as being formed integrally together with the rest of the main shaft 32 as a unitary piece, it may alternatively be a separate component bolted or otherwise secured to the main shaft 32. As shown, the main shaft 32 is hollow so as to define an interior cavity 48 and includes an annular internal ledge 50 positioned within the interior cavity 48 proximate the end opposite the flange portion 46 and facing toward the flange portion 46. A plurality of longitudinally-extending bores 52 are provided in the internal ledge 50 for receiving respective fasteners 54, for reasons described below. While only two bores 52 and two fasteners 54 are shown, any suitable number of bores 52 and respective fasteners 54 may be arranged (e.g., circumferentially) on the internal ledge 50.

The first and second bearings 36, 38 support the main shaft 32 for rotation about the main axis 34 (or y-axis) but prevent other relative motions between the bearing housing 40 and main shaft 32. A wide-spread tapered roller bearing arrangement is shown. In particular, the first and second bearings 36, 38 are single-row tapered roller bearings spaced apart within the bearing housing 40 and arranged in an O-configuration; the forces normal to the rolling elements are converged outside of the space between the bearings (thereby creating an effective spread larger than the distance between the bearings). Other bearing arrangements are also possible. For example, the main shaft 32 may alternatively be supported by some combination of cylindrical roller bearings, spherical roller bearings, or tapered roller bearings, each with either a single row or multiple rows of roller elements.

The main bearing housing 40 further includes shoulders 56, 58 to help position the first and second bearings 36, 38 in the axial direction. Similarly, the main shaft 32 may include one or more notches 60 to further assist in positioning the first and second bearings 36, 38 against the respective shoulders 56, 58. In addition or alternatively, one or more pre-tensioning elements (not shown) may extend between portions of the main shaft 32 and one or more of the first and second bearings 36, 38 to push the one or more of the first and second bearings 36, 38 against the respective shoulder(s) 56, 58.

In any event, the illustrated gearbox 42 is suspended from the bearing housing 40 and main shaft 32; there is no support for the gearbox 42 itself. More specifically, the gearbox 42 includes the gearbox input member 44, which is coupled to the main shaft 32 via a front coupling surface 62 of the gearbox input member 44, and a gearbox housing 64, which is suspended from the bearing housing 40. This suspension need not be direct. For example, a coupling housing (not shown) may connect the gearbox housing 64 to the main bearing housing 40 and at least partially surround the interface between the main shaft 32 and gearbox input member 44, as described in greater detail below with respect to FIGS. 5 and 6. Accordingly, the gearbox housing 64 may be suspended from the bearing housing 40 via such a coupling housing. Stated differently, the gearbox housing 64 may only be supported at one end and, therefore, cantilevered from the bearing housing 40 directly or indirectly via such a coupling housing. In the embodiment shown, the gearbox input member 44 extends from the gearbox housing 64 into the interior cavity 48 of the main shaft 32 such that the coupling surface 62 of the gearbox input member 44 is positioned completely therein.

This particular arrangement has advantages that will be more apparent based on the description below. Those skilled in wind turbine design, however, will appreciate other arrangements having the same kinematic relationship. For example, the rigidly connected elements supporting the main shaft 32 (e.g., the first and second bearings 36, 38 and the bearing housing 40) can more generally be referred to as a "support structure" and considered part of the same kinematic body. The gearbox housing 64 is also part of this kinematic body because it is rigidly coupled to the bearing housing 40. With this in mind, other embodiments where a gearbox is rigidly coupled to the same structure supporting a main shaft, such as a base frame, will be apparent. There need not necessarily be suspension unless particular advantages associated with the suspension arrangement are desired. On a more general level, the associated kinematic body has two joints: a first one with the main shaft 32, and a second one with the gearbox input member 44. The first joint (the support of the main shaft 32) has already been described. In terms of the second joint, the gearbox housing 64 (and, therefore, its associated kinematic body) supports the gearbox input member 44 for rotation about the main axis 34 and inhibits other relative movements.

The type of gearbox input member 44 depends on the particular gearbox design. A planet carrier for a differential gearbox is shown, although details of the differential gearbox are not illustrated because other gearbox designs suitable for wind turbines may be used instead. This includes, for example, conventional planetary gearboxes, compound planetary gearboxes, fixed carrier planetary gearboxes, etc. involving single or multiple stages. Regardless of the gearbox design, the gearbox input member 44 is flexibly coupled to the main shaft 32. There are different ways in which this may be achieved, and several examples will be described below. Each involves a flexible connection or coupling 70a-d such that the main shaft 32 and gearbox input member 44 are not rigidly connected; they are different kinematic bodies joined at the flexible coupling 70a-d. Advantageously, the flexible coupling 70a-d provides translational degrees of freedom at least along the y-axis (or main axis 34) and rotational degrees of freedom only about the x-axis and z-axis. There is no rotational degree of freedom about the y-axis (or main axis 34) because the flexible coupling 70a-d is torsionally stiff.

In this embodiment, the flexible coupling 70a includes a coupling element in the form of a substantially flat annular flexible disc 72 positioned between the internal ledge 50 of the main shaft 32 and the coupling surface 62 of the gearbox input member 44, such that the flexible coupling 70a is positioned entirely within the interior cavity 48 of the main shaft 32. In the embodiment shown, the flexible disc 72 has an inner region adjacent an inner diameter coupled to the coupling surface 62 of the gearbox input member 44 via one or more fasteners (not shown) and an outer region adjacent an outer diameter coupled to the internal ledge 50 of the main shaft 32 via the illustrated fasteners 54. The fasteners 54 for the connection between the flexible disc 72 and the gearbox input member 44 and/or main shaft 32 may include bolts, shear pins, expansion bolts/pin, and/or any other suitable fasteners. While not shown, the flexible disc 72 may have a slightly increased thickness in these connection areas. In another embodiment, the flexible disc 72 may be integrally formed together with the main shaft 32 as a unitary piece. For example, the flexible disc 72 may be casted together with the main shaft 32.

In general, the flexible disc 72 may have an outer diameter that is substantially greater than its thickness. Moreover, the outer diameter of the flexible disc 72 may be substantially greater than the inner diameter. This geometric relationship and/or the materials provide the flexible disc 72 with flexibility in certain directions. In particular, a thin disc like (the flexible disc 72): i) is much more rigid in the radial direction than in the axial direction ii) can flex to allow its inner diameter to move relative to the outer diameter in the axial direction; and iii) can also flex to allow its inner diameter to twist (i.e., rotate) relative to the outer diameter about axes perpendicular to the axial direction. Suitable materials for the flexible disc 72 include, without limitation: metals (e.g., iron, steel, titanium), composite materials (e.g., glass fibers and resins), carbon-reinforced plastic materials, or combinations thereof.

As a result of this arrangement, the flexible coupling 70a functions as a double-joint that can accommodate different types of misalignments. More specifically, the flexible coupling 70a can be broken down into three kinematic bodies: the main shaft 32 (including the internal ledge 50), the flexible disc 72, and the gearbox input member 44 (including the coupling surface 62). A first joint is defined between the main shaft 32 and flexible disc 72. A second joint is defined between the flexible disc 72 and gearbox input member 44.

This kinematic relationship is what provides the flexible coupling 70a with a translational degree of freedom along the y-axis and rotational degrees of freedom about the x-axis and z-axis. Other relative movements may be constrained. As can be appreciated from FIG. 3, if the main shaft 32 becomes misaligned with the gearbox input member 44 in an angular direction, and/or axial direction (e.g., offset along y-axis), the relative translations and rotations described above accommodate these misalignments. When this kinematic relationship is combined with the other relationships in the power transmission system 30 (the number of kinematic bodies, number of joints, and degrees of freedom), the system has low sensitivity to alignment mistakes, tolerances, load deformations, thermal expansions, and other conditions that might otherwise lead to misalignments and unwanted, "parasitic" forces damaging sensitive components. Therefore, the power transmission system 30 is able to accomplish its primary function—the transfer of torque—in a reliable manner.

Moreover, by positioning the flexible coupling 70a entirely within the interior cavity 48 of the main shaft 32, the flexible coupling 70a may be surrounded by the main shaft 32 such that no dedicated coupling housing may be required between the main bearing housing 40 and the gearbox housing 64. Thus, the main bearing housing 40 may be coupled directly to the gearbox housing 64 while the flexible coupling 70a is housed securely within the main shaft 32. By eliminating the coupling housing, such a configuration may provide appreciable space savings in the nacelle 14 of the wind turbine 10 relative to the configurations disclosed in the '924 patent, for example, while addressing the reliability concerns described above.

Figure 4:
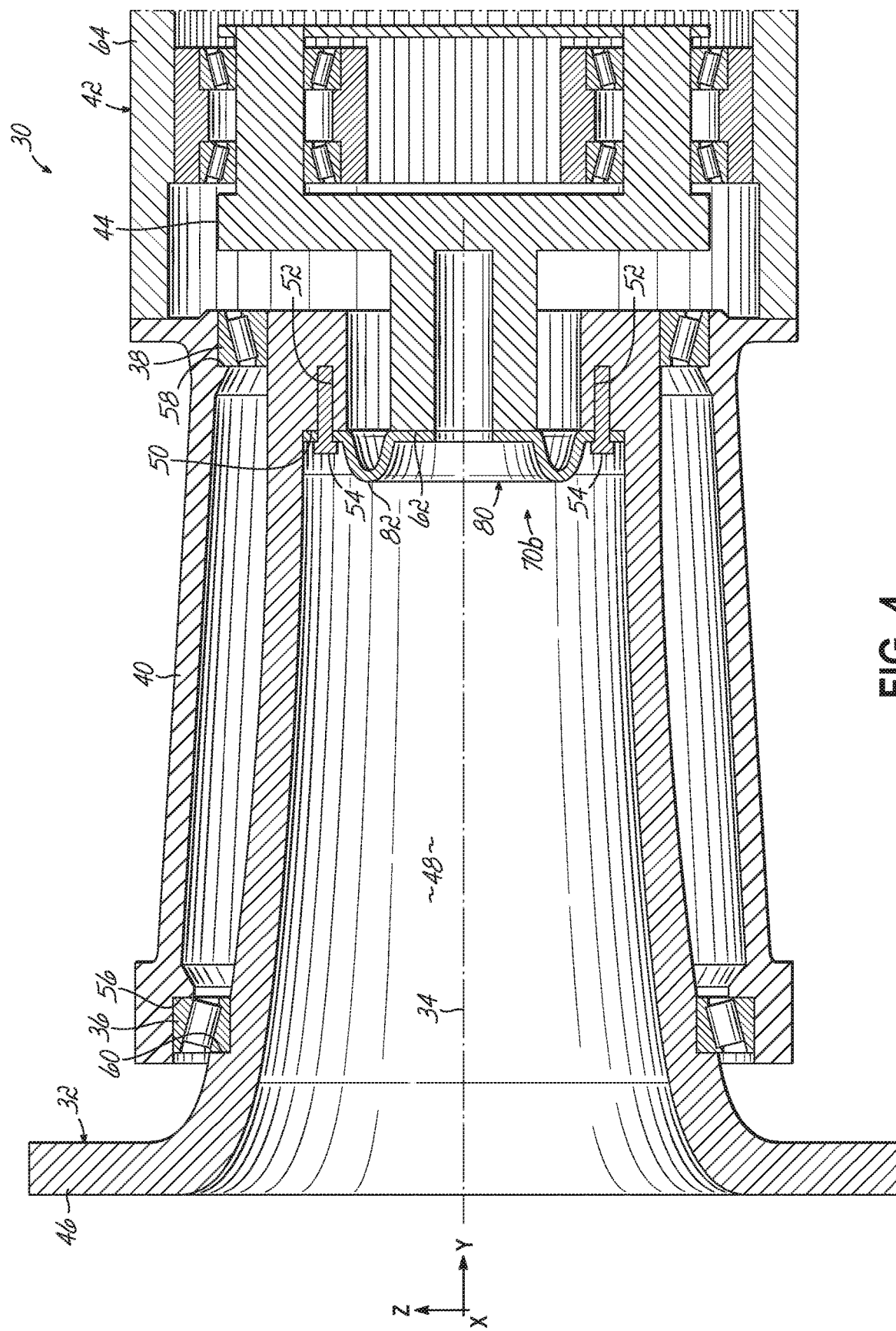
FIG. 4 is a partial cross-sectional view of an alternative power transmission system for the wind turbine of FIG. 1.

FIG. 4 illustrates an alternative embodiment where the flexible coupling 70b includes a coupling element in the form of an undulated annular flexible disc 80 having a generally longitudinally-extending annular undulation or ridge 82, the flexible disc 80 being positioned between the internal ledge 50 of the main shaft 32 and the coupling surface 62 of the gearbox input member 44, such that the flexible coupling 70b is positioned entirely within the interior cavity 48 of the main shaft 32. In the embodiment shown, the flexible disc 80 has an inner region adjacent an inner diameter coupled to the coupling surface 62 of the gearbox input member 44 via one or more fasteners (not shown) and an outer region adjacent an outer diameter coupled to the internal ledge 50 of the main shaft 32 via the illustrated fasteners 54. The fasteners 54 for the connection between the flexible disc 80 and the gearbox input member 44 and/or main shaft 32 may include bolts, shear pins, expansion bolts/pin, and/or any other suitable fasteners. While not shown, the flexible disc 80 may have a slightly increased thickness in these connection areas. In another embodiment, the flexible disc 80 may be integrally formed together with the main shaft 32 as a unitary piece. For example, the flexible disc 80 may be casted together with the main shaft 32.

In general, the flexible disc 80 may have an outer diameter that is substantially greater than its thickness. Moreover, the outer diameter of the flexible disc 80 is substantially greater than the inner diameter. This geometric relationship and/or the materials provide the flexible disc 80 with flexibility in certain directions in manners similar to the embodiment described above with respect to FIG. 3, such that the flexible disc 80 can flex to allow its inner diameter to move relative to the outer diameter in the axial direction, and can also flex to allow its inner diameter to twist (i.e., rotate) relative to the outer diameter about axes perpendicular to the axial direction. In addition, the annular ridge 82 my provide the flexible disc 80 with flexibility in the radial direction. Suitable materials for the flexible disc 80 include, without limitation: metals (e.g., iron, steel, titanium), composite materials (e.g., glass fibers and resins), carbon-reinforced plastic materials, or combinations thereof.

As a result of this arrangement, the flexible coupling 70b functions as a double-joint that can accommodate different types of misalignments. More specifically, the flexible coupling 70b can be broken down into three kinematic bodies: the main shaft 32 (including the internal ledge 50), the flexible disc 80, and the gearbox input member 44 (including the coupling surface 62). A first joint is defined between the main shaft 32 and flexible disc 80. A second joint is defined between the flexible disc 80 and gearbox input member 44.

This kinematic relationship is what provides the flexible coupling 70b with translational degrees of freedom in all directions and rotational degrees of freedom about the x-axis and z-axis. Other relative movements may be constrained. As can be appreciated from FIG. 4, if the main shaft 32 becomes misaligned with the gearbox input member 44 in a radial direction (e.g., offset along x-axis or z-axis), an angular direction, and/or axial direction (e.g., offset along y-axis), the relative translations and rotations described above accommodate these misalignments. When this kinematic relationship is combined with the other relationships in the power transmission system 30 (the number of kinematic bodies, number of joints, and degrees of freedom), the system has low sensitivity to alignment mistakes, tolerances, load deformations, thermal expansions, and other conditions that might otherwise lead to misalignments and unwanted, "parasitic" forces damaging sensitive components. Therefore, the power transmission system 30 is able to accomplish its primary function—the transfer of torque—in a reliable manner.

Moreover, by positioning the flexible coupling 70b entirely within the interior cavity 48 of the main shaft 32, the flexible coupling 70b may be surrounded by the main shaft 32 such that no dedicated coupling housing may be required between the main bearing housing 40 and the gearbox housing 64. Thus, the main bearing housing 40 may be coupled directly to the gearbox housing 64 while the flexible coupling 70b is housed securely within the main shaft 32. By eliminating the coupling housing, such a configuration may provide appreciable space savings in the nacelle 14 of the wind turbine 10 relative to the configurations disclosed in the '924 patent, for example, while addressing the reliability concerns described above.

Figure 5:
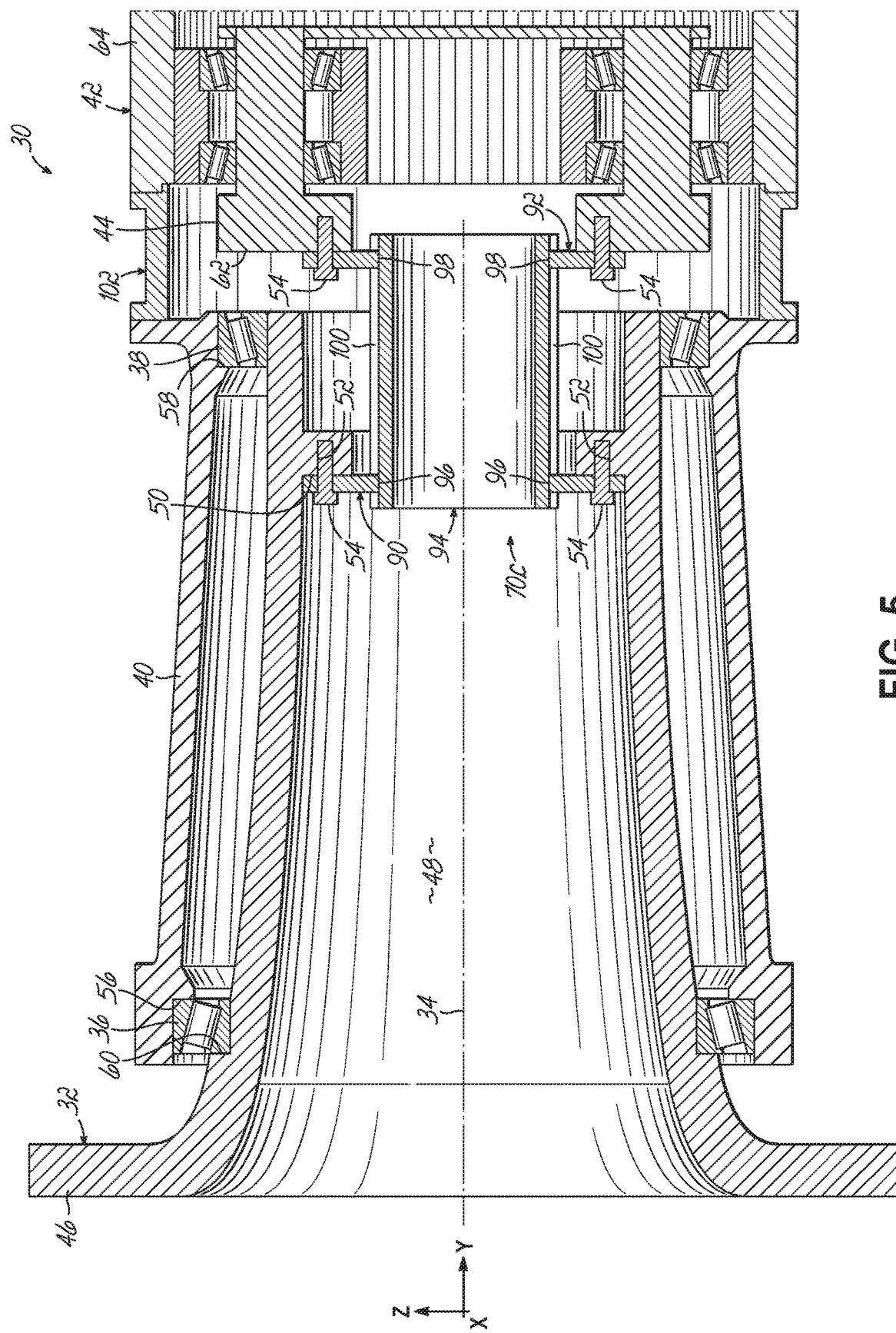
FIG. 5 is a partial cross-sectional view of another alternative power transmission system for the wind turbine of FIG. 1.

FIG. 5 illustrates an alternative embodiment where the flexible coupling 70c includes a curved spline tooth coupling defined by a generally ring-shaped coupling flange 90 of the main shaft 32 and a generally ring-shaped coupling flange 92 of the gearbox input member 44, each circumferentially engaging a generally tubular coupling element 94. The main shaft coupling flange 90 and gearbox input member coupling flange 92 are shown as separate components bolted to the internal ledge 50 of the main shaft 32 and the front coupling surface 62 (illustrated as an annular surface in FIG. 5) of the gearbox input member 44, respectively, via fasteners 54 such that the flexible coupling 70c is positioned at least partially within the interior cavity 48 of the main shaft 32. For example, one or both of the coupling flanges 90, 92 may be positioned entirely or partially within the interior cavity 48 of the main shaft 32, and/or the coupling element 94 may be positioned entirely or partially within the interior cavity 48 of the main shaft 32. In any event, the coupling flanges 90, 92 rotate with the respective components. Pins (not shown) may extend between each coupling flange 90, 92 and the component to which it is bolted at various locations to help transfer torque. The connection may be additionally or alternatively supported by placing a friction plate (not shown) between each coupling flange 90, 92 and the component to which it is secured. The friction plate may be, for example, a metal disc coated with a friction-enhancing material. Torque is a function of forces causing rotation about the main axis 34 and distance from the main axis 34. Therefore, increasing the ability to transfer torque by means of the pins and/or friction plates enables larger forces to be transferred through the connections without having to increase the diameter of the main shaft 32 or gearbox input member 44. In alternative embodiments, the coupling flanges 90, 92 may be integrally formed together with the main shaft 32 and gearbox input member 44, respectively, as unitary pieces.

As shown, the coupling flanges 90, 92 include radially-inwardly projecting teeth 96, 98 and the coupling element includes corresponding radially-outwardly projecting teeth 100 configured to engage the radially-inwardly projecting teeth 96, 98. Therefore, two gear meshes are defined. There may be equal numbers of teeth on the coupling flanges 90, 92 and coupling element 94 such that there is a 1:1 gear ratio. One set of teeth in each gear mesh may have substantially straight profiles, while the other set may have profiles crowned in an axial direction. For example, the radially-inwardly projecting teeth 96, 98 on the coupling flanges 90, 92 may be the ones with a crowned profile, and the radially-outwardly projecting teeth 100 on the coupling element 94 may have straight profiles and extend along its length to mesh with the radially-inwardly projecting teeth 96, 98.

As a result of this arrangement, the flexible coupling 70c functions as a double-joint that can accommodate different types of misalignments. More specifically, the flexible coupling 70c can be broken down into three kinematic bodies: the main shaft 32 (including the coupling flange 90 thereof), the coupling element 94, and the gearbox input member 44 (including the coupling flange 92 thereof). A joint is defined between each coupling flange 90, 92 and the coupling element 94. In this particular embodiment, the joints are gear meshes. Each joint permits relative rotation around the x-axis and z-axis as a result of the interaction between the straight teeth 100 and the crowned teeth 96, 98. Relative translation in an axial direction (e.g., along the main axis 34) is also permitted because the straight teeth 100 do not constrain the crowned teeth 96, 98 in this direction. The joints may not be designed for other relative movements.

This kinematic relationship is what provides the flexible coupling 70c with translational degrees of freedom in all directions and rotational degrees of freedom about the x-axis and z-axis. Other relative movements may be constrained. As can be appreciated from FIG. 5, if the main shaft 32 becomes misaligned with the gearbox input member 44 in a radial direction (e.g., offset along x-axis or z-axis), an angular direction, and/or axial direction (e.g., offset along y-axis), the relative translations and rotations described above accommodate these misalignments. When this kinematic relationship is combined with the other relationships in the power transmission system 30 (the number of kinematic bodies, number of joints, and degrees of freedom), the system has low sensitivity to alignment mistakes, tolerances, load deformations, thermal expansions, and other conditions that might otherwise lead to misalignments and unwanted, "parasitic" forces damaging sensitive components. Therefore, the power transmission system 30 is able to accomplish its primary function—the transfer of torque—in a reliable manner.

Moreover, by positioning the flexible coupling 70c at least partially within the interior cavity 48 of the main shaft 32, the flexible coupling 70c may be at least partially surrounded by the main shaft 32 such that a coupling housing 102 positioned between the main bearing housing 40 and the gearbox housing 64 for surrounding remaining portions of the flexible coupling 70c, such as the gearbox input member coupling flange 92 and/or a portion of the coupling element 94, may be sizably reduced (e.g., shortened) relative to the configurations disclosed in the '924 patent, for example. By sizably reducing the coupling housing 102, such a configuration may provide appreciable space savings in the nacelle 14 of the wind turbine 10 relative to the configurations disclosed in the '924 patent, for example, while addressing the reliability concerns described above. In another embodiment, positioning the flexible coupling 70c at least partially within the interior cavity 48 of the main shaft 32 may enable the illustrated coupling housing 102 to be eliminated such that the main bearing housing 40 may be directly coupled to the gearbox housing 64 in a manner similar to that described above with respect to FIGS. 3 and 4.

Figure 6:
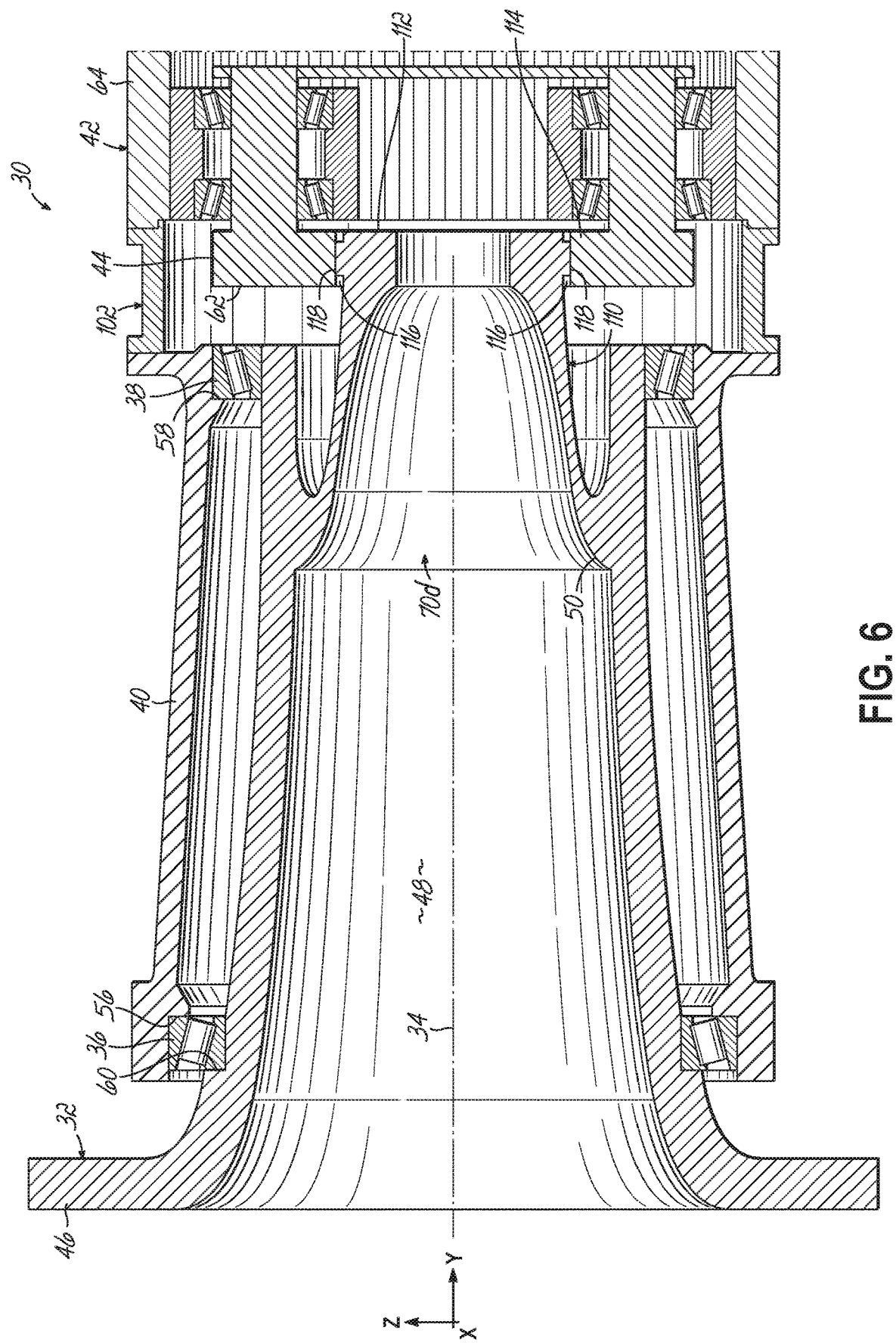
FIG. 6 is a partial cross-sectional view of yet another alternative power transmission system for the wind turbine of FIG. 1.

FIG. 6 illustrates an alternative embodiment where the flexible coupling 70d includes an elastic spline tooth coupling defined by a flexible tube 110 of the main shaft 32 terminating at a generally tubular coupling element 112, and by a coupling flange 114 of the gearbox input member 44 which circumferentially engages the coupling element 112. The flexible tube 110 and coupling flange 114 are shown as being integrally formed together with the internal ledge 50 of the main shaft 32 and the coupling surface 62 of the gearbox input member 44, respectively, as unitary pieces such that the flexible coupling 70d is positioned at least partially within the interior cavity 48 of the main shaft 32. For example, the flexible tube 110 and/or coupling flange 114 may be positioned entirely or partially within the interior cavity 48 of the main shaft 32, and/or the coupling element 112 may be positioned entirely or partially within the interior cavity 48 of the main shaft 32.

In general, the flexible tube 110 may have a length that is substantially greater than its thickness. This geometric relationship and/or the materials provide the flexible tube 110 with flexibility in certain directions. In particular, a thin tube like the flexible tube 110 is much more rigid in the axial direction than in the radial direction. Suitable materials for the flexible tube 110 include, without limitation: metals (e.g., iron, steel, titanium), composite materials (e.g., glass fibers and resins), carbon-reinforced plastic materials, or combinations thereof.

The coupling element 112 is shown as being integrally formed together with the flexible tube 110 as a unitary piece, and as having an increased thickness relative thereto such that the coupling element 112 itself may be substantially rigid.

As shown, the gearbox input member coupling flange 114 includes radially-inwardly projecting teeth 116 and the coupling element 112 includes corresponding radially-outwardly projecting teeth 118 configured to engage the radially-inwardly projecting teeth 116. Therefore, a single gear mesh is defined. There may be equal numbers of teeth on the gearbox input member coupling flange 114 and coupling element 112 such that there is a 1:1 gear ratio. One set of teeth in the gear mesh may have substantially straight profiles, while the other set may have profiles crowned in an axial direction. For example, the radially-inwardly projecting teeth 116 on the gearbox input member coupling flange 114 may be the ones with a crowned profile, and the radially-outwardly projecting teeth 118 on the coupling element 112 may have straight profiles and extend along its length to mesh with the radially-inwardly projecting teeth 116.

As a result of this arrangement, the flexible coupling 70d functions as a double-joint that can accommodate different types of misalignments. More specifically, the flexible coupling 70d can be broken down into three kinematic bodies: the main shaft 32 (excluding the coupling element 112), the coupling element 112, and the gearbox input member 44 (including the coupling flange 114 thereof). A first joint is defined between the internal ledge 50 and the coupling element 112. A second joint is defined between the coupling flange 114 and the coupling element 112. In this particular embodiment, the second joint is a gear mesh and it permits relative translation in an axial direction (e.g., along the main axis 34) because the radially-inwardly extending teeth 116 do not constrain the radially-outwardly extending teeth 118 in this direction. The first joint permits relative rotation around the x-axis and z-axis. The joints may not be designed for other relative movements.

This kinematic relationship is what provides the flexible coupling 70d with translational degrees of freedom in all directions and rotational degrees of freedom about the x-axis and z-axis. Other relative movements may be constrained. As can be appreciated from FIG. 6, if the main shaft 32 becomes misaligned with the gearbox input member 44 in a radial direction (e.g., offset along x-axis or z-axis), an angular direction, and/or axial direction (e.g., offset along y-axis), the relative translations and rotations described above accommodate these misalignments. When this kinematic relationship is combined with the other relationships in the power transmission system 30 (the number of kinematic bodies, number of joints, and degrees of freedom), the system has low sensitivity to alignment mistakes, tolerances, load deformations, thermal expansions, and other conditions that might otherwise lead to misalignments and unwanted, "parasitic" forces damaging sensitive components. Therefore, the power transmission system 30 is able to accomplish its primary function—the transfer of torque—in a reliable manner.

Moreover, by positioning the flexible coupling 70d at least partially within the interior cavity 48 of the main shaft 32, the flexible coupling 70d may be at least partially surrounded by the main shaft 32 such that a coupling housing 102 positioned between the main bearing housing 40 and the gearbox housing 64 for surrounding remaining portions of the flexible coupling 70d, such as the coupling element 112, coupling flange 114, and a portion of the flexible tube 110, may be sizably reduced (e.g., shortened) relative to the configurations disclosed in the '924 patent, for example. By sizably reducing the coupling housing 102, such a configuration may provide appreciable space savings in the nacelle 14 of the wind turbine 10 relative to the configurations disclosed in the '924 patent, for example, while addressing the reliability concerns described above. In another embodiment, positioning the flexible coupling 70d at least partially within the interior cavity 48 of the main shaft 32 may enable the illustrated coupling housing 102 to be eliminated such that the main bearing housing 40 may be directly coupled to the gearbox housing 64 in a manner similar to that described above with respect to FIGS. 3 and 4.

As can be appreciated, there are many different ways of providing a flexible coupling 70a-d that is positioned at least partially within the main shaft 32 and that kinematically joins the main shaft 32 to the gearbox input member 44 with one or more translational degrees of freedom at least along the main axis 34 and rotational degrees of freedom about axes perpendicular to the main axis 34. The examples discussed above do so using a flexible coupling 70a-d having two separate joints. As previously mentioned, combining the kinematic relationship provided by the flexible coupling 70a-d with the other kinematic relationships (the particular number of kinematic bodies, joints between the bodies, and degrees of freedom) secures the transfer of torque with a minimum amount of potentially-damaging, parasitic forces. And, by positioning the flexible coupling 70a-d entirely or at least partially within the main shaft 32, significant space savings may be realized, thereby allowing the flexible coupling 70a-d to be incorporated in nacelles 14 having demanding spatial constraints. For example, the impact of the flexible coupling 70a-d on the overall length of the power transmission system 30 may be minimized or eliminated by sizably reducing or eliminating any dedicated coupling housing 102 around the flexible coupling 70a-d.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A power transmission system for increasing the rotational speed from a rotor of a wind turbine, comprising:
   a main shaft configured to be driven by the rotor about a main axis;
   a support structure including at least one bearing supporting the main shaft for rotation about the main axis and constraining other movements of the main shaft; and
   a gearbox having a gearbox housing arranged adjacent to the support structure in a direction of the main axis, the gearbox housing rigidly coupled to the support structure and a gearbox input member coupled to the main shaft, the gearbox housing supporting the gearbox input member for rotation about the main axis while constraining other movements of the gearbox input member, and the gearbox input member being coupled to the main shaft with a translational degree of freedom along the main axis and rotational degrees of freedom about axes perpendicular to the main axis,
   wherein the main shaft is coupled to the gearbox input member by a flexible coupling positioned at least partially within the main shaft.

2. The power transmission system of claim 1, wherein the flexible coupling is positioned entirely within the main shaft.

3. The power transmission system of claim 1, wherein the main shaft defines an interior cavity and includes an internal ledge positioned within the interior cavity, and wherein at least a portion of the flexible coupling is attached to the internal ledge.

4. The power transmission system of claim 1, wherein the flexible coupling includes a flexible disc.

5. The power transmission system of claim 4, wherein the flexible disc is flat.

6. The power transmission system of claim 4, wherein the flexible disc includes an annular ridge.

7. The power transmission system of claim 4, wherein the flexible disc has an inner region adjacent an inner diameter coupled to the gearbox input member and an outer region adjacent an outer diameter coupled to the main shaft.

8. The power transmission system of claim 4, wherein the flexible disc has an outer diameter that is substantially greater than a thickness of the flexible disc.

9. The power transmission system of claim 4, wherein the flexible disc has an outer diameter that is substantially greater than an inner diameter of the flexible disc.

10. The power transmission system of claim 6, wherein the gearbox input member is coupled to the main shaft with translational degrees of freedom along the axes perpendicular to the main axis.

11. The power transmission system of claim 1, wherein the flexible coupling includes a spline tooth coupling.

12. The power transmission system of claim 11, wherein the spline tooth coupling is defined by a coupling flange of the main shaft and a coupling flange of the gearbox input member, each circumferentially engaging a coupling element.

13. The power transmission system of claim 12, wherein the coupling flanges each include radially projecting teeth and the coupling element includes radially projecting teeth configured to engage the radially projecting teeth of the coupling flanges thereby defining two gear meshes, and wherein one set of radially-projecting teeth in each gear mesh have substantially straight profiles and the other set have profiles crowned in an axial direction.

14. The power transmission system of claim 13, wherein the radially-projecting teeth of the coupling flanges have crowned profiles.

15. The power transmission system of claim 12, wherein the coupling flanges surround the coupling element.

16. The power transmission system of claim 11, wherein the spline tooth coupling is elastic.

17. The power transmission system of claim 16, wherein the elastic spine tooth coupling is defined by a flexible tube of the main shaft terminating at a coupling element, and by a coupling flange of the gearbox input member which circumferentially engages the coupling element.

18. The power transmission system of claim 17, wherein the flexible tube and the coupling element are integrally formed together with the main shaft as a unitary piece.

19. The power transmission system of claim 1, wherein the support structure includes a bearing housing, and wherein the bearing housing is directly coupled to the gearbox housing.

20. A wind turbine comprising:
a rotor having a hub and a plurality of blades extending outwardly from the hub; and
the power transmission system of claim 1, wherein the main shaft is coupled to the hub so as to be driven by the rotor.

* * * * *